Patented Sept. 6, 1938

2,129,334

UNITED STATES PATENT OFFICE 2,129,334

PLANT FOOD

Charles Northen, Orlando, Fla.

No Drawing. Application January 4, 1937,
Serial No. 119,021

2 Claims. (Cl. 71—2)

The present invention relates to a plant food, and more particularly to an organic soil amending plant food.

For a long time, it has been recognized by authorities in the industry that there is a need for organic soil amending plant foods, which could be sold to agriculturists and horticulturists at moderate prices.

Muck, peat, and humus, deposits of which can be found in every section of the country, have heretofore appeared to be the ideal source from which to draw essential organic soil and plant foods. Much effort has been put forth to develop this idea, and it appears, the matter was first approached in a rather crude way and without sufficient study. The material was taken from the deposits and applied to the soil without any previous treatment. It was not only disappointing in the results obtained, but it, in fact, caused a lot of trouble with the soils on which it was applied.

The next step was the belief that it was essential to dry and pulverize the aforementioned material to make it "available" as a plant food.

Although experimenters in various parts of the country spent enormous sums of money trying to economically dry the material, nevertheless, failure attended their efforts, for the reason that it was found that when these materials were well dried, they would not absorb moisture in sufficient amounts to make them available as soil amenders and plant foods; in fact, they were found harmful, because they interfered with free circulation of moisture in the soil and were said to interfere with the germination of seeds and, in addition, prevented plant roots from getting enough moisture.

In the early development of agriculture, man's first source from which to increase plant food in the soil was animal manure. It is a well established fact that these manures have many values besides the nitrogen, phosphate, and potash they contain.

In addition, it has been stated that the advent of the combustion engine and its substitution for animal power on farms and in cities has greatly reduced the quality of manures available for use in growing plants. This reduction was stated as being particularly marked in regions adjacent to the centers of population where large quantities of manures are utilized for truck gardening, lawns, flower beds, etc. The increasing uncertainty as to the quantity and quality of manures still obtainable has stimulated the search for satisfactory substitutes.

Users of substitutes have come to realize that muck, peat, humus, etc. are not identical with manures in their effect on soils. Part of this difference is undoubtedly due to the relative quantities of available nutrients carried by the various materials, but a further part, is the result of differences in physical characteristics.

Various workers have called attention to the relation between organic matter in soils and such physical properties as the hygroscopic coefficient maximum water-holding capacity—available water—and porosity. Certain writers have expressed the opinion that the physical condition of soils may influence its productivity quite as much as a chemical composition.

Sandy soils are notoriously low in water-holding capacity and are frequently so open that the water passes through rapidly without greatly benefiting plant growth. The admixture of organic matter or clay to such soils is usually recommended to correct their deficiencies. It has been found, upon investigation, that the addition of peaty materials increased the capacity to retain available water. From the pratcical standpoint, it is noteworthy that the peats have been more valuable for increasing moisture capacity than has well-rotted manure.

Peaty materials which have become thoroughly dry take up moisture very slowly and may produce an undesirable physical condition when incorporated with the soil, particularly if the moisture supply is limited, or if the water is supplied infrequently in large amounts. The undesirable effect may be intensified in the field, if dry layers of peat are placed below the surface of the soil within the root zone, or if the peat layers become very dry.

As previously stated, studies have been made to find economical methods of making large deposits of muck or peat in the United States available for agricultural use. The physical properties of these materials have, however, been a barrier to the success of this research.

As also stated above, once these mucks and peats are dried, they become unsafe for use with crops, which has been the cause of their being universally condemned by research workers.

A study of the chemistry of the various peats, mucks, and humuses did not point the way to the solution of the difficulty. A study of the physical properties, however, revealed that the changes through which this material went in drying were responsible for the difficulties barring its successful use in agriculture.

All vegetable matter contains natural waxes and resins. The cells and particles shrink so, that the waxes and resins are forced out of the tissues, and these harden on the outside. Due to loss by disintegration and leaching of soluble materials in vegetable matter, the proportions of these waxes and resins are higher in peat, muck, and humus than in fresh vegetable matter. On account of these changes, the material cannot readily take up moisture in quantity.

One of the primary objects of the invention, therefore, is the preparation of a plant food using humus, muck, and peat, to which has been added a hydrophilic or water-absorbing filler in colloidal form, so as to prevent the cells from closing as the material dries.

As is well known, there are certain natural deposits in the United States, particularly in such localities as Florida and Tennessee, in which agricultural phosphate rock deposits are found. This phosphate rock is mined, as by the use of steam shovels and the like, the shovels lifting the entire mass of the material from the earth, both matrix and rocks. This material is deposited on what are commonly known as "log washers" and water is passed over the material, washing away all foreign matter, leaving the rock clean. This foreign matter is dumped with the water at the end of the log washer and runs by gravity to some depression in the earth's surface, or to an impounding dam. The colloidal plant food, also known as "colloidal phosphate" or "waste pond phosphate", is in the matrix and on the surface of the hard rock. Naturally, the heavier and coarser materials settle first, while the lighter material flows away with the water as far as the water goes. The length and distance this water runs, together with the slope over which it is passed, determines, to some extent, the quality of the fine material obtained and which is known as "colloidal phosphate" or "waste pond phosphate".

The chemical composition of the waste pond phosphate is largely determined by the manner of refining and the source of the deposit. Experimentation has proven that a composition having approximately the following chemical analysis constitutes a standard product and forms an excellent base to be used in the manner hereinafter described.

|  | Per cent |
|---|---|
| Phosphoric acid | 26.40 |
| Calcium oxide | 31.26 |
| Alumina | 5.45 |
| Oxide iron | 4.26 |
| Carbon dioxide | 12.40 |
| Soda | .56 |
| Potash | 1.16 |
| Carbonate of lime | 7.83 |
| Manganese dioxide | .05 |
| Magnesia | 1.10 |
| Sulphur | .57 |
| Fluorine | .72 |
| Titanium | .42 |
| Iodine, vanadium, chromium, other rare elements and silicious materials | 7.82 |

However, it becomes important to control the range of certain chemical compounds present in the plant food. For example, the amount of calcium present should be controlled, as by the addition of calcium-containing materials, the added calcium being in an amount of from 2% to 30% of the aforementioned base. Magnesium, also, should be added in about the same ratio as the calcium. In some instances, it is desirable to add copper, preferably in a range from .5% to 5.%; zinc in about the same quantity; iodine from .05% to 1.%; borax from .05% to 5.%; and manganese from .5% to 3.%. The calcium may be added in the form of calcium carbonate or oxide. The magnesium may be added in the form of carbonate or oxide or sulphate of magnesium. The copper may be an oxide or a sulphate or colloidal copper. The zinc may be an oxide or sulphate or colloidal, as may be the manganese. The iodine may be colloidal or in the form of iodide of potash or tincture of iodine or any organic combinations carrying iodine.

By mixing under pressure, comminuting, or amalgamating with tube or pebble mills, or with rolls the mineral colloidal material just described with the peat, muck, or humus before it dries, the cells of the organic material are filled, so that they do not close, and shrinkage does not take place in drying. Treated in this manner, the materials may be dried for any desired period of time and yet they will quickly absorb as much moisture as they can hold. Bacterial development and activity in this mixture are greatly increased, and further, the plant food content of the mixture is also greatly increased by the addition of the colloidal matter mentioned above.

The process consists in mixing, under pressure, or comminuting or amalgamating wet peat, muck, or humus with determined quantities of the mineral colloidal material, which will result in filling the material, cells, or pores, so as to prevent them from closing when drying, and prevent the shrinkage of the material, in order that the resins and waxes will not be squeezed out and harden on the surface of the particle.

An approximate analysis of a good grade of humus to use in making the product of this application is as follows:—

|  | Per cent |
|---|---|
| Moisture | 44.87 |
| Maximum water-holding capacity | 581.12 |
| Acidity pH | 6.2 |

*Dry basis*

|  |  |
|---|---|
| Ash | 8.68 |
| Organic matter | 91.32 |
| Total nitrogen | 3.25 |
| Phosphorus | .24 |
| Potash | .11 |
| Calcium | .168 |

Coming now to the proportions in which the mineral colloidal material is amalgamated or intimately mixed with the muck, humus, or peat, it has been found that proportions of from 25% of the mineral colloidal material with about 75% of the peat, muck, or humus give a satisfactory product. The latter, however, may range in proportions from 25% to 75% of the whole.

The two products are thoroughly mixed before the peat, muck, or humus is dried, and if the proportion of the mineral colloidal material is so high as to take up too much moisture before blending, the mass should have water added thereto until it is soft or plastic enough to cause a thorough blending of the materials in order to force the mineral colloidal material into the pores of the peat, muck, or humus.

It is of the utmost importance that there be a thorough blending, amalgamating, or comminuting of the mineral colloidal material and the humus, muck, or peat into a very fine uniform mass.

After the treatment above described, the material may be dried and pulverized to whatever fineness may be found desirable or practical for use.

After the final product has been treated, as suggested, it will be found to be a most desirable colloidal, mineral, and organic product. It can be used unchanged for application to certain soils for the purpose of improving their texture, their water-holding capacity, their capacity to promote capillarity in soils, to support bacterial action, and to hold soluble plant foods from rapidly leaching from the soil; also for amending soils as to their mineral and organic content. This material may further be used in commercial fertilizers.

If desired, it may be fortified by the addition of liquid ammonias or ammonia or nitrogen salts or other forms of nitrate or ammonia; also by the addition of potash in solution or in the form of potash salts of various kinds. If it is desirable to increase its phosphoric content, it may be associated with any form of phosphate, and these may be added in desired amounts and mixed in whatever proportions or on whatever basis conditions require.

Under certain conditions, the product formed as above described will be greatly enhanced if it contains certain insecticides. For that reason, there will be times when it is desirable to add tobacco or tobacco stems to this material in the proportion of 5% to 15%; also calcium arsenate in the proportion of .005% to .5%.

The organic mineralized soil amender above-described has been found to be of very great value in that it forms an increased vitamin content of fruits and vegetables grown on a soil on which it is used. For example, the industry of growing ferns in Florida, while very profitable, is virtually at a standstill because of the difficulties due to the methods of fertilization. However, it has been found possible to construct a suitable fertilizer for ferns by the use of the organic mineralized colloidal material set forth.

Having thus described my invention, what I claim as new and desire to secure by Letters Patent is:—

1. A composition of matter for stimulating plant growth comprising a carbonaceous substance chosen from the group consisting of humus, muck and peat and a natural colloidal phosphate fertilizer and added compounds of calcium, magnesium, copper, zinc, iodine, boron and manganese, said natural colloidal phosphate fertilizer and added compounds filling the cells of the humus, muck or peat and being intimately blended therewith forming a fine uniform mass, said natural colloidal phosphate fertilizer on analysis showing as its principal constituents approximately 26% phosphoric acid and 31% calcium oxide, said added compounds being in the following approximate ratios to said phosphate fertilizer: phosphate fertilizer 100 parts to between 2.0 and 30.0 parts of the calcium compound, to between 2.0 and 30.0 parts of the magnesium compound, to between .5 and 5.0 parts of the copper compound, to between .5 and 5.0 parts of the zinc compound, to between .05 and 1.0 part of the iodine compound, to between .05 and 1.0 part of the boron compound, to between .5 and 3.0 parts of the manganese compound; and said humus, muck or peat being in the approximate ratio of 3 parts to 1 part of said combined phosphate fertilizer and added compounds.

2. A composition of matter for stimulating plant growth comprising a carbonaceous substance chosen from the group consisting of humus, muck and peat and a colloidal waste pond phosphate and added compounds of calcium, magnesium, copper, zinc, iodine, boron and manganese, said colloidal waste pond phosphate and added compounds filling the cells of the humus, muck or peat and being intimately blended therewith forming a fine uniform mass, said added compounds being in the following approximate ratios to said waste pond phosphate: colloidal waste pond phosphate 100 parts to between 2.0 and 30.0 parts of the calcium compound, to between 2.0 and 30.0 parts of the magnesium compound, to between .5 and 5.0 parts of the copper compound, to between .5 and 5.0 parts of the zinc compound, to between .05 and 1.0 part of the iodine compound, to between .05 and 1.0 part of the boron compound, to between .5 and 3.0 parts of the manganese compound; and said humus, muck or peat being in the approximate ratio of 3 parts to 1 part of said combined colloidal waste pond phosphate and added compounds.

CHARLES NORTHEN.